United States Patent
Yamada

(10) Patent No.: US 11,487,511 B2
(45) Date of Patent: Nov. 1, 2022

(54) INFORMATION PROCESSING APPARATUS AND NON-TRANSITORY COMPUTER READABLE MEDIUM

(71) Applicant: FUJIFILM BUSINESS INNOVATION CORP., Tokyo (JP)

(72) Inventor: Ryohei Yamada, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/005,810

(22) Filed: Aug. 28, 2020

(65) Prior Publication Data
US 2021/0271457 A1 Sep. 2, 2021

(30) Foreign Application Priority Data
Feb. 27, 2020 (JP) .............................. JP2020-031447

(51) Int. Cl.
*G06F 8/34* (2018.01)
*G06F 11/36* (2006.01)
*G06F 9/451* (2018.01)

(52) U.S. Cl.
CPC ................ *G06F 8/34* (2013.01); *G06F 9/451* (2018.02); *G06F 11/3636* (2013.01); *G06F 11/3664* (2013.01)

(58) Field of Classification Search
CPC ..... G06F 8/34; G06F 11/3636; G06F 11/3664
See application file for complete search history.

(56) References Cited

U.S. PATENT DOCUMENTS

| | | | |
|---|---|---|---|
| 2008/0040191 A1* | 2/2008 | Chakravarty | G06Q 10/063114 705/7.15 |
| 2013/0111429 A1* | 5/2013 | Poole | G06Q 10/06 717/101 |
| 2014/0129607 A1* | 5/2014 | Nagumo | H04L 41/5048 709/201 |
| 2016/0094754 A1* | 3/2016 | Miyazawa | H04N 1/00482 358/1.13 |

FOREIGN PATENT DOCUMENTS

| | | |
|---|---|---|
| JP | 2002-259643 A | 9/2002 |
| JP | 2008-15986 A | 1/2008 |

* cited by examiner

*Primary Examiner* — Duy Khuong T Nguyen
(74) *Attorney, Agent, or Firm* — Oliff PLC

(57) ABSTRACT

An information processing apparatus includes a processor configured to accept a setting for a timing of an input of an attribute value of a specific attribute when creating a program that runs by linking a first application of a link source and a second application of a link target. The specific attribute is one of attributes handled by the first application or the second application, and the attribute value of the specific attribute is variable in accordance with progress of a process performed by the program.

8 Claims, 14 Drawing Sheets

FIG. 5

| TARGET ATTRIBUTE | SOURCE ATTRIBUTE | ATTRIBUTE EXTRACTION METHOD | USER INPUT SETTING |
|---|---|---|---|
| ... | ... | ... | ... |

| LINK TARGET || LINK SOURCE ||
|---|---|---|---|
| ATTRIBUTE | ATTRIBUTE VALUE | ATTRIBUTE | ATTRIBUTE VALUE |
| TITLE | title 2 | DOCUMENT NAME | name 2 |
| CONTRACT NUMBER | 0357 | CONTRACT NUMBER | 0357 |
| ... | ... | ... | ... |

| LINK TARGET |||
|---|---|---|
| DATE AND TIME | OPERATOR | STATUS |
| 10-18-2019 11:12 | RYOHEI YAMADA | IN PROCESS |
| 10-18-2019 11:36 | TARO YAMADA | FINISHED |

FIG. 7A

| TARGET ATTRIBUTE | SOURCE ATTRIBUTE | ATTRIBUTE EXTRACTION METHOD | USER INPUT SETTING |
|---|---|---|---|
| | DOCUMENT NAME | | |
| | CONTRACT NUMBER | AUTOMATIC EXTRACTION OF CHARACTER STRING | |
| | CONTRACTOR | | |
| | DATE OF CONTRACT | AUTOMATIC SETTING (DATE) | |
| | ... | | |
| | NOTE | | |
| | | | |
| | | | |

| TARGET ATTRIBUTE | SOURCE ATTRIBUTE | ATTRIBUTE EXTRACTION METHOD | USER INPUT SETTING |
|---|---|---|---|
| TITLE | DOCUMENT NAME | | |
| CONTRACT NUMBER | CONTRACT NUMBER | AUTOMATIC EXTRACTION OF CHARACTER STRING | |
| CONTRACTOR | CONTRACTOR | | |
| DATE OF CONTRACT | DATE OF CONTRACT | AUTOMATIC SETTING (DATE) | |
| ... | ... | | |
| NOTE | NOTE | | |
| STATUS | | | |
| OPERATOR | | | |

| TARGET ATTRIBUTE | SOURCE ATTRIBUTE | ATTRIBUTE EXTRACTION METHOD | USER INPUT SETTING |
|---|---|---|---|
| TITLE | DOCUMENT NAME | | |
| CONTRACT NUMBER | CONTRACT NUMBER | AUTOMATIC EXTRACTION OF CHARACTER STRING | |
| CONTRACTOR | CONTRACTOR | | |
| DATE OF CONTRACT | DATE OF CONTRACT | AUTOMATIC SETTING (DATE) | |
| ... | ... | | |
| NOTE | NOTE | | INPUT AT WEB REGISTRATION |
| STATUS | | | INPUT AT SCAN |
| OPERATOR | | | INPUT AT SCAN |

| | | |
|---|---|---|
| FILENAME | | |
| DOCUMENT TYPE | CONTRACT | |
| DOCUMENT TITLE *REQUIRED | title 2 | |
| CONTRACT NUMBER | 0357 | |
| CONTRACTOR | XX CO. LTD | |
| DATE OF CONTRACT | 12/23/2019 (DEFAULT VALUE) | |
| PRODUCT NAME | ABC | |
| AMOUNT | ¥598,000 | |
| NOTE *REQUIRED  201 | | 202 |

200

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2020-031447 filed Feb. 27, 2020.

BACKGROUND

(i) Technical Field

The present disclosure relates to an information processing apparatus and a non-transitory computer readable medium.

(ii) Related Art

Programs for running different kinds of applications to process operations have recently been proposed (for example, refer to Japanese Unexamined Patent Application Publication No. 2002-259643).

In the program disclosed in Japanese Unexamined Patent Application Publication No. 2002-259643, a business-process definition program displays a business-process definition screen, on which a program is launched to define information for linking business-operation programs. Information components for linking business-operation programs are associated with operation nodes selected on the business-process definition screen, and if it is determined that the information components can be associated with the operation nodes, execution of the program to define information for linking business-operation programs is finished.

SUMMARY

Applications to be linked together have some attributes whose attribute values cannot be set at the start of an operation.

Aspects of non-limiting embodiments of the present disclosure relate to providing an information processing apparatus and a non-transitory computer readable medium storing an information processing program, which can set the timing of an input of an attribute value of an attribute when attributes of applications to be linked together are associated with each other, the attribute value being variable in accordance with progress.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a processor configured to accept a setting for a timing of an input of an attribute value of a specific attribute when creating a program that runs by linking a first application of a link source and a second application of a link target. The specific attribute is one of attributes handled by the first application or the second application, and the attribute value of the specific attribute is variable in accordance with progress of a process performed by the program.

BRIEF DESCRIPTION OF THE DRAWINGS

An exemplary embodiment of the present disclosure will be described in detail based on the following figures, wherein:

FIG. 5 is an illustration depicting an example of a database;

FIG. 6A is an illustration depicting an example of first history information, and FIG. 6B is an illustration depicting an example of second history information;

FIG. 7A is an illustration depicting an example of content recorded in the database;

FIG. 7B is an illustration depicting an example of content recorded in the database;

FIG. 7C is an illustration depicting an example of content recorded in the database;

FIG. 12 is an illustration depicting an example of a screen for web registration;

DETAILED DESCRIPTION

Figure 1:
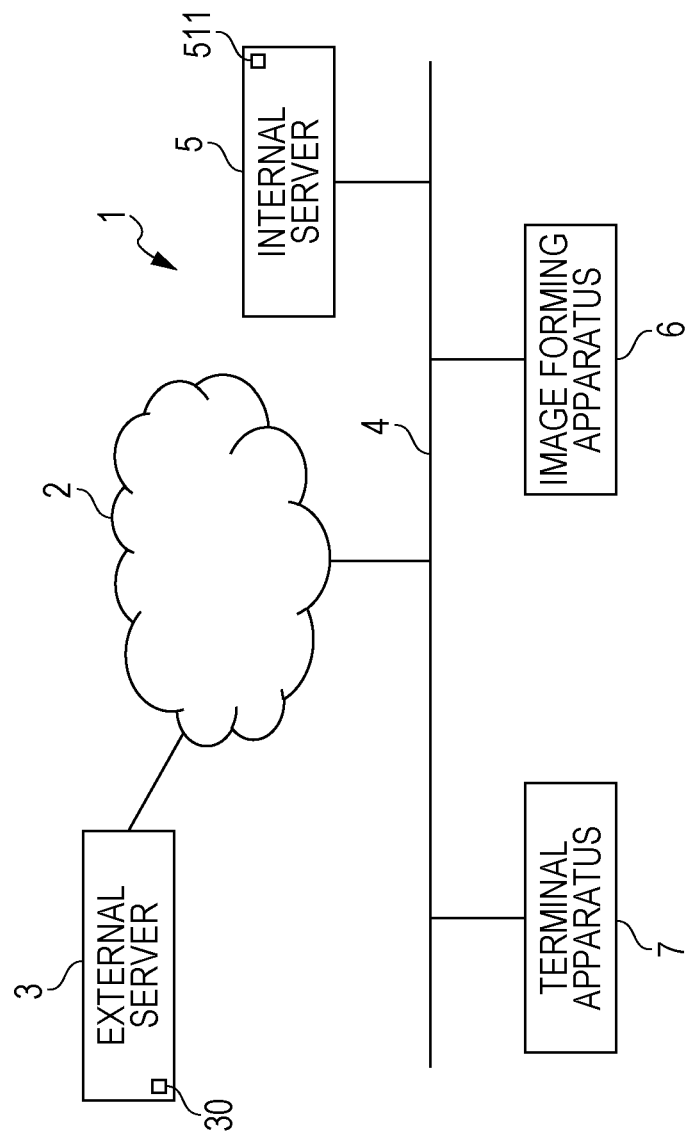
FIG. 1 is an illustration depicting an example of a configuration of an information processing system according to the exemplary embodiment of the present disclosure.

An exemplary embodiment of the present disclosure will be described hereinafter with reference to the drawings. In the drawings, elements having substantially identical functions are denoted by the same reference signs, and duplicate descriptions thereof will be omitted.

Summarization of Exemplary Embodiment

An information processing apparatus according to the present exemplary embodiment includes a processor configured to accept a setting for a timing of an input of an attribute value of a specific attribute when creating a program that runs by linking a first application of a link source and a second application of a link target. The specific attribute is one of attributes handled by the first application or the second application, and the attribute value of the specific attribute is variable in accordance with progress of a process performed by the program.

An attribute handled by the first application of the link source (also referred to as a "source application" below) is also referred to as a "source attribute" below, and an attribute handled by the second application of the link target (also referred to as a "target application" below) is also referred to as a "target attribute" below. A source attribute and a target attribute sometimes have the same content but have different attribute names. Thus, when a program, such as a workflow, which links a source application and a target application, is created, a setting is typically configured so as to form linkage between a source attribute and a target attribute. In some cases, a source attribute does not have a counterpart among target attributes, or a target attribute does not have a counterpart among source attributes. A workflow is defined as a series of operations that are associated with each other.

Some attributes of the source attributes and the target attributes have attribute values that can be set before the start of program execution (for example, at the start of an operation), and other attributes have attribute values that cannot be set before the start of program execution. Examples of an attribute whose attribute value cannot be set before the start of program execution include attributes whose attribute values are variable in accordance with the progress of a process performed by a program, such as status and an operator. The program is not limited to a program for a business operation.

Exemplary Embodiment

FIG. 1 is an illustration depicting an example of a configuration of an information processing system according to the exemplary embodiment of the present disclosure. An information processing system 1 includes an external server 3, an internal network 4, an internal server 5, an image forming apparatus 6, and at least one terminal apparatus 7. The external server 3 is located in an external network 2, such as the Internet. The internal network 4 is a network such as a local area network or an intranet that is connected to the external network 2 by using a device such as a router or a gateway. The internal server 5, the image forming apparatus 6, and the at least one terminal apparatus 7 are connected to the internal network 4. The at least one terminal apparatus 7 may include a single terminal apparatus or more than one terminal apparatuses. The internal server 5 is an example of the information processing apparatus.

The external server 3 retains software such as a target application 30 to be linked to another application. The external server 3 is configured to transmit to the terminal apparatus 7 and the image forming apparatus 6 information regarding a screen containing a web page provided by the target application 30. The target application 30 is an example of the second application.

The internal server 5 retains software such as a source application 511 to be linked to another application. The internal server 5 is configured to transmit to the terminal apparatus 7 and the image forming apparatus 6 information regarding a screen containing a web page provided by the source application 511. The source application 511 is an example of the first application.

Configuration of Internal Server

Figure 2:
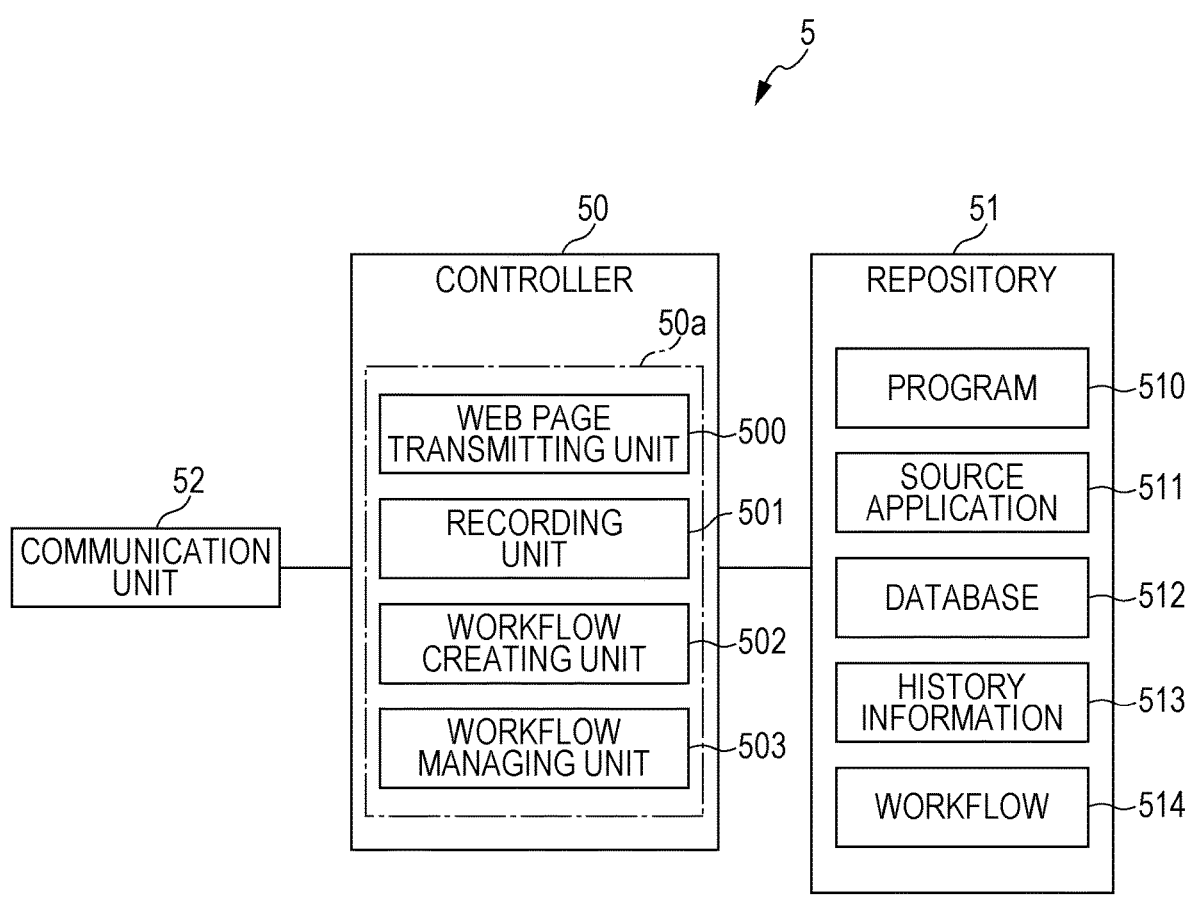
FIG. 2 is a block diagram depicting an example of a control system of an internal server.

FIG. 2 is a block diagram depicting an example of a control system of the internal server 5. The internal server 5 includes a controller 50, which controls each unit of the internal server 5, a repository 51, and a communication unit 52.

The controller 50 is formed by a processor 50a, such as a central processing unit (CPU), an interface, and the like. The processor 50a executes a program 510 stored in the repository 51 and performs various functions, such as a web page transmitting unit 500, a recording unit 501, a workflow creating unit 502, and a workflow managing unit 503.

The repository 51 is formed by components such as a read-only memory (ROM), a random-access memory (RAM), and a hard disk and stores various kinds of information, such as the program 510, the source application 511, a database 512 (refer to FIGS. 5 and 7), history information 513 (refer to FIGS. 6A and 6B), and a workflow 514. The workflow 514 is an example of a program to realize a workflow that links the source application 511 and the target application 30.

The communication unit 52 communicates with the external server 3 via the external network 2 and communicates with the image forming apparatus 6 and the terminal apparatus 7 via the internal network 4.

As depicted in FIGS. 6A and 6B described below, the history information 513 includes first history information 513a and second history information 513b. The first history information 513a indicates a correspondence between target attributes and source attributes. The correspondence is set at the start of the workflow 514 execution, for example, at the start of an operation. The second history information 513b indicates history information regarding attribute values that are input after the start of the workflow 514 execution, for example, during an operation.

Next, each of the units 500 to 503 of the internal server 5 will be described.

The web page transmitting unit 500 transmits to the terminal apparatus 7 and the image forming apparatus 6 information regarding various screens containing web pages provided by the source application 511.

Further, the web page transmitting unit 500 causes a display 73 of the terminal apparatus 7 to present attributes handled by the source application 511 or by the target application 30. Specifically, one or more attributes (also referred to as "specific attributes" below) each of which has an attribute value that cannot be set before the start of the workflow 514 execution are presented in a display region for in-process-input attributes 122 (refer to FIG. 10), and one or more attributes (also referred to as "other attributes" below) each of which has an attribute value that can be set before the start of the workflow 514 execution are presented in a display region for automatic-input attributes 121 (refer to FIG. 10). The display region for automatic-input attributes 121 and the display region for in-process-input attributes 122 are each an example of a separate display region.

Further, the web page transmitting unit 500 accepts an order, such as a drag-and-drop operation, to move one of the specific attributes or one of the other attributes from one of the display region for automatic-input attributes 121 and the display region for in-process-input attributes 122 to the other.

In accordance with setting information configured regarding source attributes, the recording unit 501 records the source attributes in the database 512 (refer to FIG. 7A) and creates the first history information 513a (refer to FIG. 6A). Further, in accordance with setting information containing linkage settings, the recording unit 501 records target attributes in the database 512 (refer to FIG. 7B) and records attributes and attribute values (hereinafter, also referred to as "attribute information") of the link target in the first history information 513a (refer to FIG. 6A) and updates the first history information 513a. In accordance with setting information containing user input setting, the recording unit 501 records input timings in the database 512 (refer to FIG. 7C) and updates the second history information 513b (refer to FIG. 6B).

During the workflow 514 execution, the workflow managing unit 503 causes the web page transmitting unit 500 to transmit information regarding an input screen containing a web page at an input time point that is entered into an item "user input setting" of the database 512. The information regarding the input screen is transmitted to a transmission destination, the image forming apparatus 6 or the terminal apparatus 7, whichever is suitable based on the input time point. For example, if the input time point is set to a time point during a scan, the information regarding the input screen is transmitted to the image forming apparatus 6. If the input time point is set to a time point at web registration, the information regarding the input screen is transmitted to the terminal apparatus 7.

Configuration of Image Forming Apparatus

Figure 3:
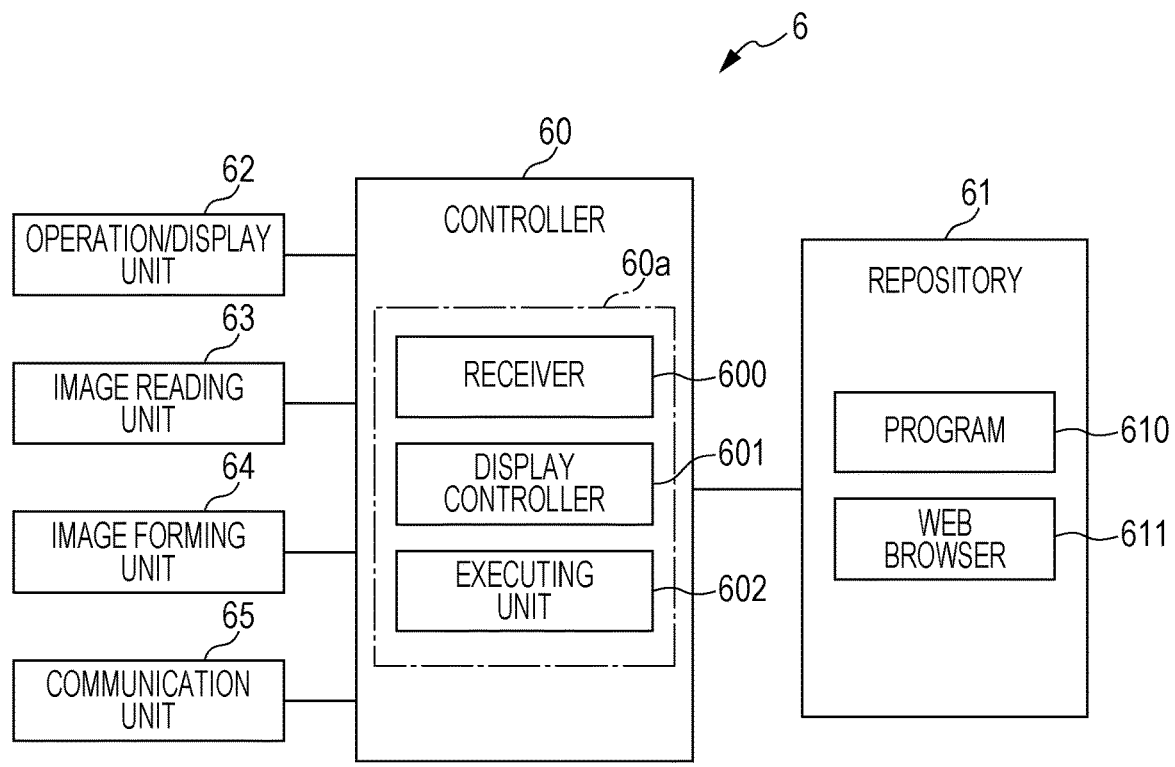
FIG. 3 is a block diagram depicting an example of a control system of an image forming apparatus.

FIG. 3 is a block diagram depicting an example of a control system of the image forming apparatus 6. The image forming apparatus 6 is, for example, a multifunction peripheral having functions such as a scanning function, a printing function, a copying function, an emailing function, and a facsimile transmitting and receiving function. The image forming apparatus 6 also has a function of performing a character recognition process and an extraction process. In the character recognition process, character recognition is performed on image data obtained from a paper document by using the scanning function. In the extraction process, attributes of the document are extracted from the character recognition result. Both the character recognition process and the extraction process may be performed by the internal server 5. Alternatively, the extraction process may be performed by the internal server 5.

The image forming apparatus 6 includes a controller 60, which controls each unit of the image forming apparatus 6, and various units such as a repository 61, an operation/display unit 62, an image reading unit 63, an image forming unit 64, and a communication unit 65 are connected to the controller 60.

The controller 60 is formed by a processor 60a, such as a CPU, an interface, and the like. The processor 60a executes a program 610 stored in the repository 61 and performs various functions, such as a receiver 600, a display controller 601, and an executing unit 602.

The repository 61 is formed by components such as a ROM, a RAM, and a hard disk and stores various kinds of information, such as the program 610 and a web browser 611. The web browser 611 is used for viewing a web page provided by the external server 3 and by the internal server 5.

The operation/display unit 62 is used for entering and displaying information. The operation/display unit 62 is, for example, a touch panel display constituted by a touch panel stacked on a display such as a liquid crystal display.

The image reading unit 63 includes an automatic document feeder installed on a document glass and a scanner that optically acquires a document image from a document placed on the document glass or from a document conveyed from the automatic document feeder.

The image forming unit 64 produces a printed material by forming images on a sheet supplied from a sheet feed cassette, for example, by using an electrophotographic system or an inkjet system.

The communication unit 65 communicates with external apparatuses, such as the terminal apparatus 7, the external server 3, and the internal server 5, via the internal network 4 and the external network 2.

Next, each of the units 600 to 602 of the image forming apparatus 6 will be described.

The receiver 600 accepts a job indicated by an operation on the operation/display unit 62, a print job transmitted from the terminal apparatus 7 via the internal network 4, or a print job for facsimile transmitted from an external apparatus via a public network.

The display controller 601 causes the operation/display unit 62 to present a web page provided by the external server 3 or the internal server 5 and transmits information that is entered into the web page to the external server 3 or the internal server 5.

The executing unit 602 performs a job accepted by the receiver 600 by controlling the image reading unit 63, the image forming unit 64, or the communication unit 65.

Configuration of Terminal Apparatus

Figure 4:
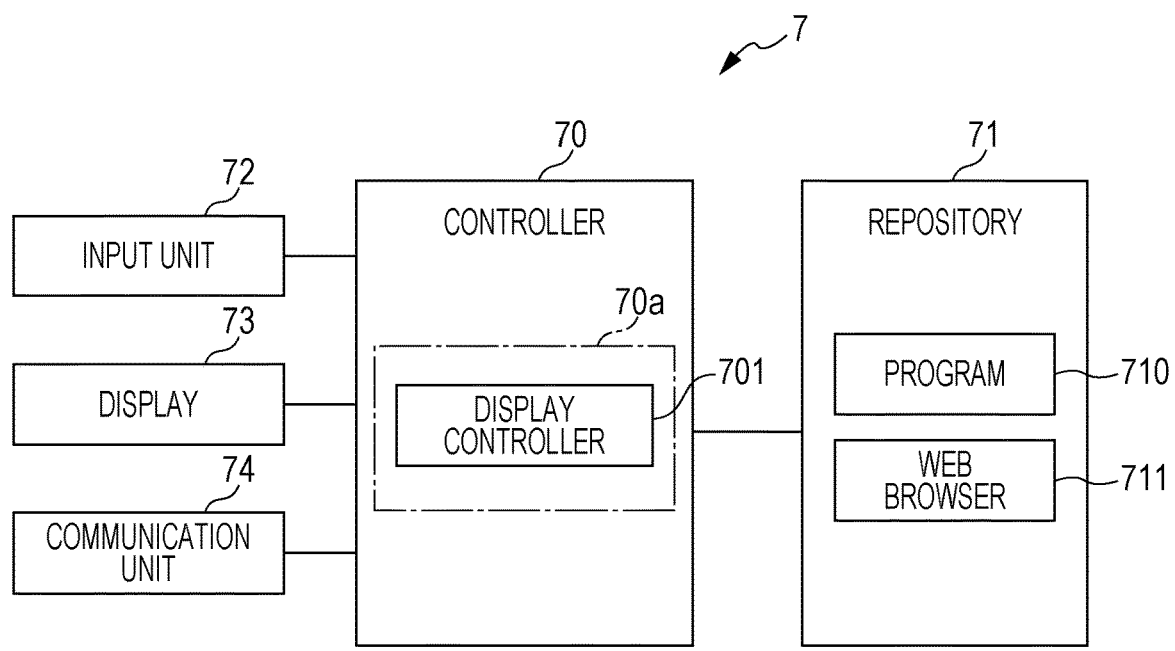
FIG. 4 is a block diagram depicting an example of a control system of a terminal apparatus.

FIG. 4 is a block diagram depicting an example of a control system of the terminal apparatus 7. The terminal apparatus 7 includes a controller 70, which controls each unit of the terminal apparatus 7, and various units such as a repository 71, an input unit 72, the display 73, and a communication unit 74 are connected to the controller 70. The input unit 72 is realized by such devices as a keyboard and a mouse, and the display 73 is realized by such a device as a liquid crystal display.

The controller 70 is formed by a processor 70a, such as a CPU, an interface, and the like. The processor 70a executes a program 710 stored in the repository 71 and performs various functions, such as a display controller 701.

The repository 71 is formed by components such as a ROM, a RAM, and a hard disk and stores various kinds of information, such as the program 710 and a web browser 711. The web browser 711 is used for viewing a web page provided by the external server 3 and by the internal server 5.

FIG. 5 is an illustration depicting an example of the database 512 retained by the internal server 5. The database 512 has a plurality of items such as "target attribute", "source attribute", "attribute extraction method", and "user input setting".

The item "target attribute" records one or more attributes selected from attributes handled by the target application 30. The item "source attribute" records one or more attributes selected from attributes handled by the source application 511. The item "attribute extraction method" records a method of extracting an attribute value of a source attribute. The item "user input setting" records an input timing for an attribute value.

FIG. 6A is an illustration depicting an example of the first history information 513a retained by the internal server 5. The first history information 513a indicates a correspondence between attribute values of the target attributes and attribute values of the source attributes. The correspondence is formed at the start of an operation. The first history information 513a has items "attribute" and "attribute value" for the link target and items "attribute" and "attribute value" for the link source. An attribute of the link target and an attribute of the link source on the same row are associated with each other in linkage settings described below. The source application 511 is assumed to retain attribute values of target attributes and attribute values of source attributes.

However, the target application 30 may retain attribute values of target attributes and attribute values of source attributes. Alternatively, the target application 30 may retain attribute values of target attributes, and the source application 511 may retain attribute values of source attributes.

FIG. 6B is an illustration depicting an example of the second history information 513b retained by the internal server 5. The second history information 513b indicates history information regarding attribute values that are entered at the start of the operation or during the operation and has an item indicating whether a link target or a link source is involved and items "date and time", "operator", and "status". The item "date and time" records a date and time of performing a task (for example, year, month, day, hour, and minute). The item "operator" records the name of a person who performs the task. The item "status" records the progress of a process.

The display controller 701 of the terminal apparatus 7 causes the display 73 to present a web page provided by the external server 3 or the internal server 5 and transmits information that is entered into the web page to the external server 3 or the internal server 5.

Operation of Information Processing System

Next, an example operation of the information processing system 1 will be described with reference to FIGS. 6A and 6B to FIG. 14. FIG. 14 is a flowchart depicting an example operation of the information processing system 1. A case where the terminal apparatus 7 is used for performing tasks before workflow execution will be described.

(1) Source Attribute Settings

In accordance with a request, which is transmitted from the terminal apparatus 7, for example, for creating a workflow concerning contract document management (S1), the web page transmitting unit 500 of the internal server 5 transmits to the terminal apparatus 7 information regarding a screen for setting source attributes concerning contract document management. The display controller 701 causes the display 73 to present the screen for setting source attributes.

Figure 8:
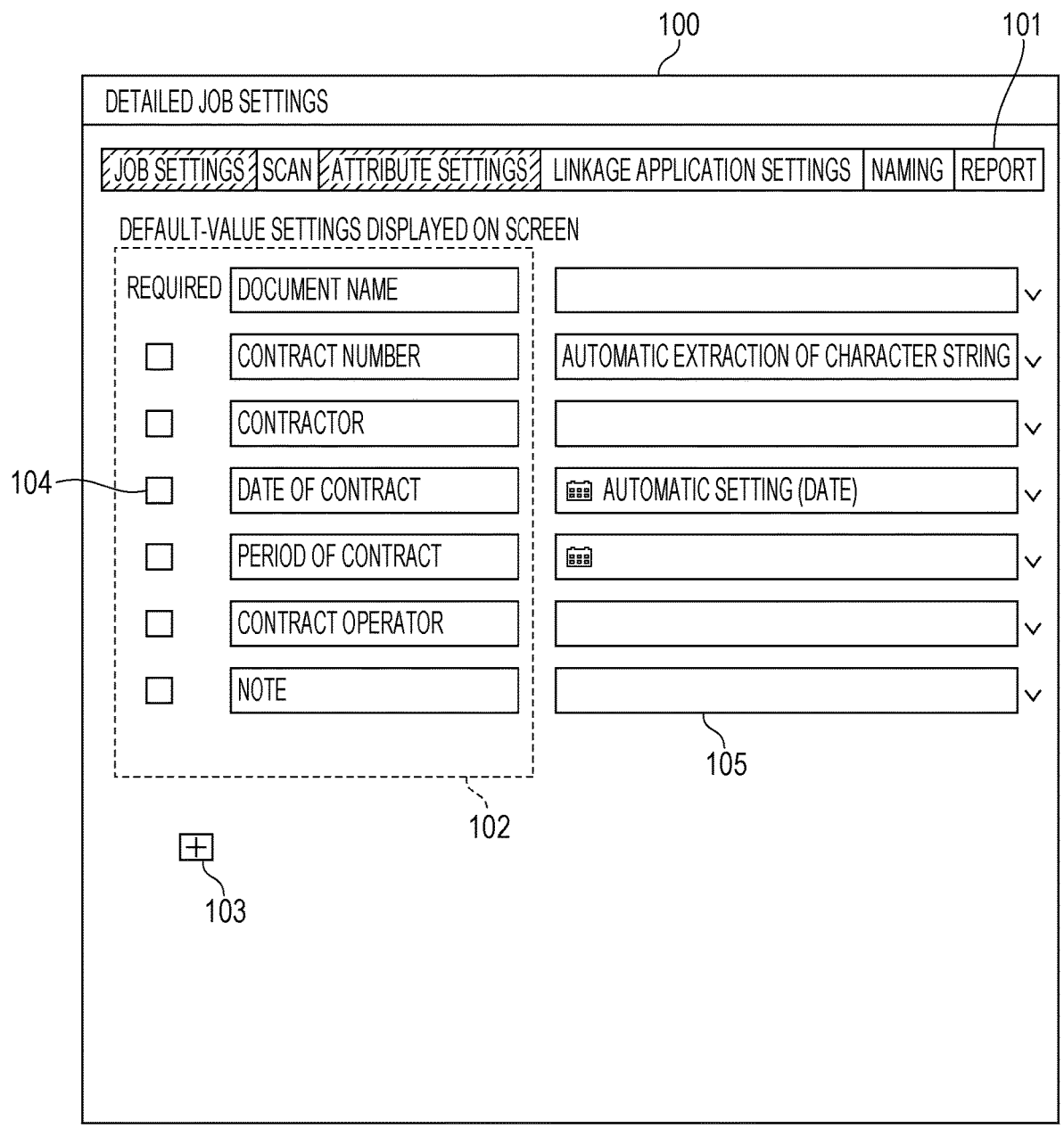
FIG. 8 is an illustration depicting an example of a screen for setting source attributes.

FIG. 8 is an illustration depicting an example of the screen for setting source attributes. A screen for setting source attributes 100 is used to set one or more attributes handled by the source application 511 and presents a plurality of tabs 101 named "job settings", "scan", "attribute settings", "linkage application settings", "naming", and "report". FIG. 8 depicts a situation in which the tab named "attribute settings" of the tabs 101 is selected.

The screen for setting source attributes 100 has a display region for source attributes 102, an add attribute button 103, check boxes 104, and input boxes for extracting method 105. The display region for source attributes 102 presents one or more attributes selected from the source attributes. The add attribute button 103 is used to add a source attribute to the display region for source attributes 102. The check boxes 104 are used for selecting one or more attributes to be removed from the source attributes presented in the display region for source attributes 102. The input boxes for extracting method 105 are each used to input a method of extracting a source attribute presented in the display region for source attributes 102.

When a user adds a source attribute to the display region for source attributes 102, the user pushes the add attribute button 103, and a list of all the source attributes is presented. Then, specifying in the list a source attribute to be added, the user is able to add the source attribute. When removing a source attribute presented in the display region for source attributes 102, the user checks one of the check boxes 104 and pushes the "delete" key in the keyboard of the input unit 72. Then, the source attribute can be removed.

The input boxes for extracting method 105 each enable the user to select an extracting method from a pull-down menu. In a method named "automatic extraction of character string" of the methods of extracting attributes, the image forming apparatus 6 automatically extracts during the workflow 514 execution a corresponding attribute value from a character recognition result obtained from image data of a document. In a method named "automatic setting (date)", the date and time of execution is automatically extracted as an attribute by using a calendar function provided by the internal server 5.

Using the screen for setting source attributes 100 depicted in FIG. 8, the user operates the input unit 72 of the terminal apparatus 7 to select one or more source attributes and enters extracting methods into the input boxes for extracting method 105 to set the one or more source attributes (S2).

As depicted in FIG. 7A, in accordance with the setting information configured regarding the source attributes in step S2, the recording unit 501 of the internal server 5 records in the database 512 the attributes presented in the display region for source attributes 102 and the methods of extracting attributes, which are entered into the input boxes for extracting method 105. Specifically, the attributes presented in the display region for source attributes 102 are recorded in the column named "source attribute" of the database 512, and the methods of extracting attributes are recorded in the column named "attribute extraction method" of the database 512.

In addition, in accordance with the setting information regarding the source attributes, the recording unit 501 of the internal server 5 creates the first history information 513a depicted in FIG. 6A. At this time, attributes and attribute values of the link source in the first history information 513a are recorded.

Next, if the user selects a tab named "linkage application settings" of the tabs 101 in the screen for setting source attributes 100 depicted in FIG. 8, the web page transmitting unit 500 of the internal server 5 transmits information regarding the screen for attribute linkage settings to the terminal apparatus 7. The display controller 701 causes the display 73 to present the screen for attribute linkage settings.

(2) Attribute Linkage Settings

Figure 9:
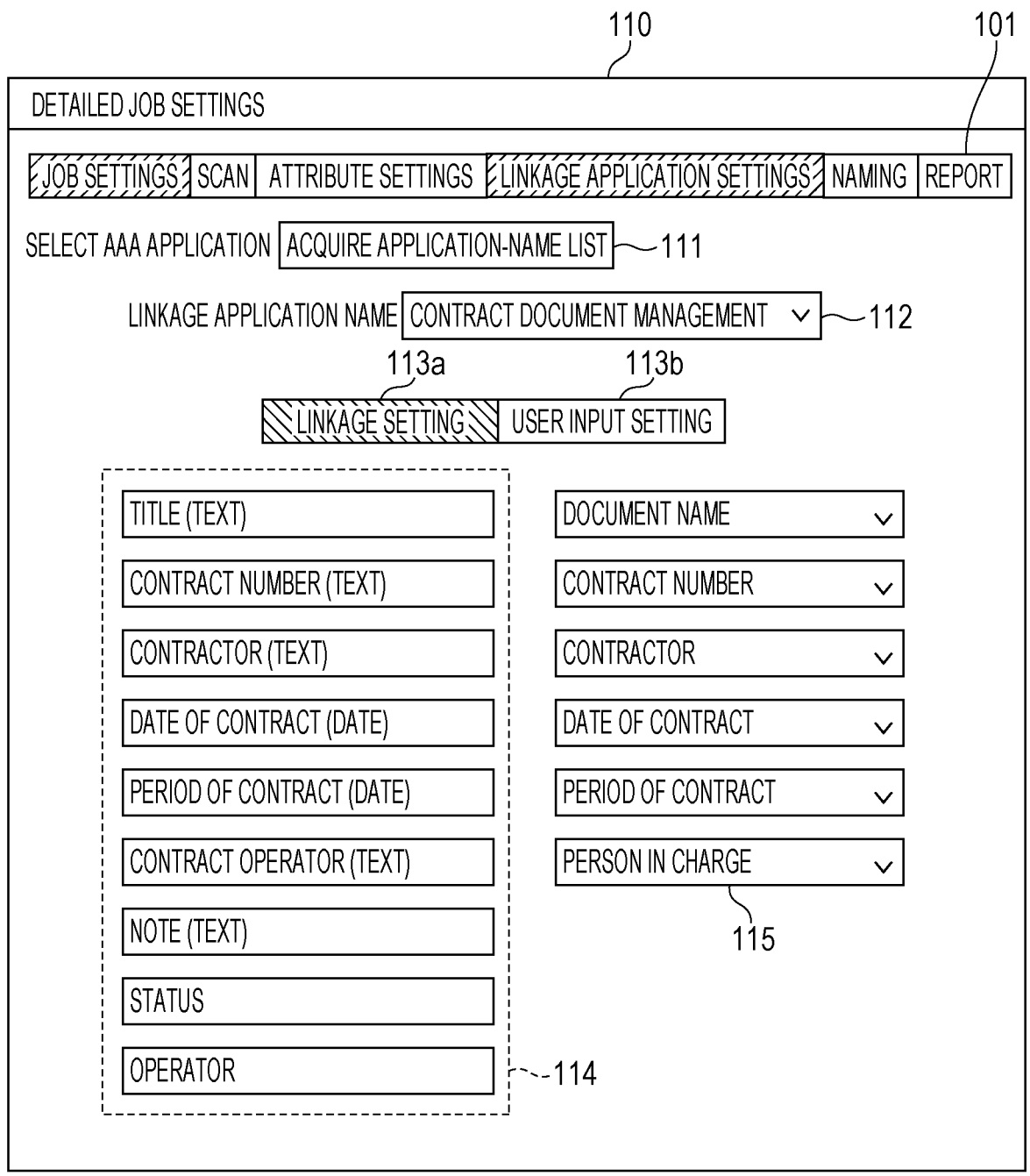
FIG. 9 is an illustration depicting an example of a screen for attribute linkage settings.

FIG. 9 is an illustration depicting an example of the screen for attribute linkage settings. A screen for attribute linkage settings 110 is used for forming linkage between a source attribute and a target attribute. Similarly to the screen for setting source attributes 100 depicted in FIG. 8, the screen for attribute linkage settings 110 presents the tabs 101 named "job settings", "scan", "attribute settings", "linkage application settings", "naming", and "report" and further presents a button 111 named "acquire application-name list", an input box for an application name 112, a button 113a named "linkage setting", and a button 113b named "user input setting". The button 111 named "acquire application-name list" is used to acquire the names of applications belonging to the AAA application, which is determined in advance. The input box for an application name 112 is used to enter the name of an application selected from the application-name list acquired from the external server 3 in response to an operation on the button 111 named "acquire application-name list". FIG. 9 depicts a situation in which the tab named "linkage application settings" of the tabs 101 and the button 113*a* named "linkage setting" are selected.

An operation on the button 111 named "acquire application-name list" causes the internal server 5 to acquire the name list of applications in the target application 30 from the external server 3 and to superimpose the name list onto the screen for attribute linkage settings 110. The user selects from the name list the name of an application to be linked. The input box for an application name 112 enables the user to select from a pull-down menu the name of an application to be linked, which belongs to an application of the link target. FIG. 9 depicts a situation in which an application named "contract document management", which belongs to the AAA application of the link target, is selected as an application to be linked. The application named "contract document management" includes progress management.

In addition, the screen for attribute linkage settings 110 has a display region for target attributes 114 and input boxes for source attributes 115. The display region for target attributes 114 presents selected one or more target attributes, and the input boxes for source attributes 115 are used for entering one or more source attributes. The input boxes for source attributes 115 each enable the user to select a source attribute from a pull-down menu. The name of a source attribute that is likely to have the same content as the content of the target attribute is automatically entered into each of the input boxes for source attributes 115 as the initial value. The name of the source attribute is inferred from the name of the target attribute by analogy. For example, if the target attribute is named "title" and the source attribute is named "document name", the name of a source attribute "document name" is inferred from the name "title" by analogy, and the name "document name" is entered into one of the input boxes for source attributes 115 as the initial value corresponding to the name "title". If no corresponding source attribute is found, the corresponding one of the input boxes for source attributes 115 is left blank. For example, the input boxes for source attributes 115 that correspond to the target attributes "status" and "operator" are left blank because no corresponding source attribute is found.

A dictionary of similar words may be used to infer an attribute name by analogy and determine the equivalence between the content of a source attribute and the content of a target attribute. Similar words include synonyms and equivalent words of an attribute name. For example, the name "title" is registered as a word equivalent to the name "document name".

Alternatively, for example, a dictionary of associative words may be used to infer an attribute name by analogy and determine the equivalence between the content of a source attribute and the content of a target attribute. The dictionary of associative words contains information that records types of variations in expression. Variations in expression indicate differences in expression that do not substantially change meaning. For example, the following types of variations in expression are included in the dictionary of associative words.

Type 1: whether a prefix is hyphenated (for example, pre-production or pre-production)

Type 2: the same meaning expressed differently (for example, quotation, quote, or estimate)

Type 3: whether "of" is used in the possessive case (for example, the name of the contractor or the contractor's name)

Type 4: whether a certain word is used (for example, "contract" or "contract document")

Using the screen for attribute linkage settings 110 depicted in FIG. 9, the user operates the input unit 72 of the terminal apparatus 7 to select a source attribute corresponding to a target attribute and configures settings to form linkage between attributes (S3).

As depicted in FIG. 7B, in accordance with the setting information in which linkage settings are configured in step S3, the recording unit 501 of the internal server 5 records the target attributes, which are presented in the display region for target attributes 114, in the column named "target attribute" of the database 512. In addition, in accordance with the setting information, the recording unit 501 of the internal server 5 records the attributes and the attribute values of the link target in the first history information 513*a* depicted in FIG. 6A and updates the first history information 513*a*.

(3) User Input Setting

Next, if the user selects the button 113*b* named "user input setting" in the screen for attribute linkage settings 110 depicted in FIG. 9, the web page transmitting unit 500 of the internal server 5 provides information regarding a screen for user input setting to the terminal apparatus 7. The display controller 701 of the terminal apparatus 7 causes the display 73 to present the screen for user input setting.

Figure 10:
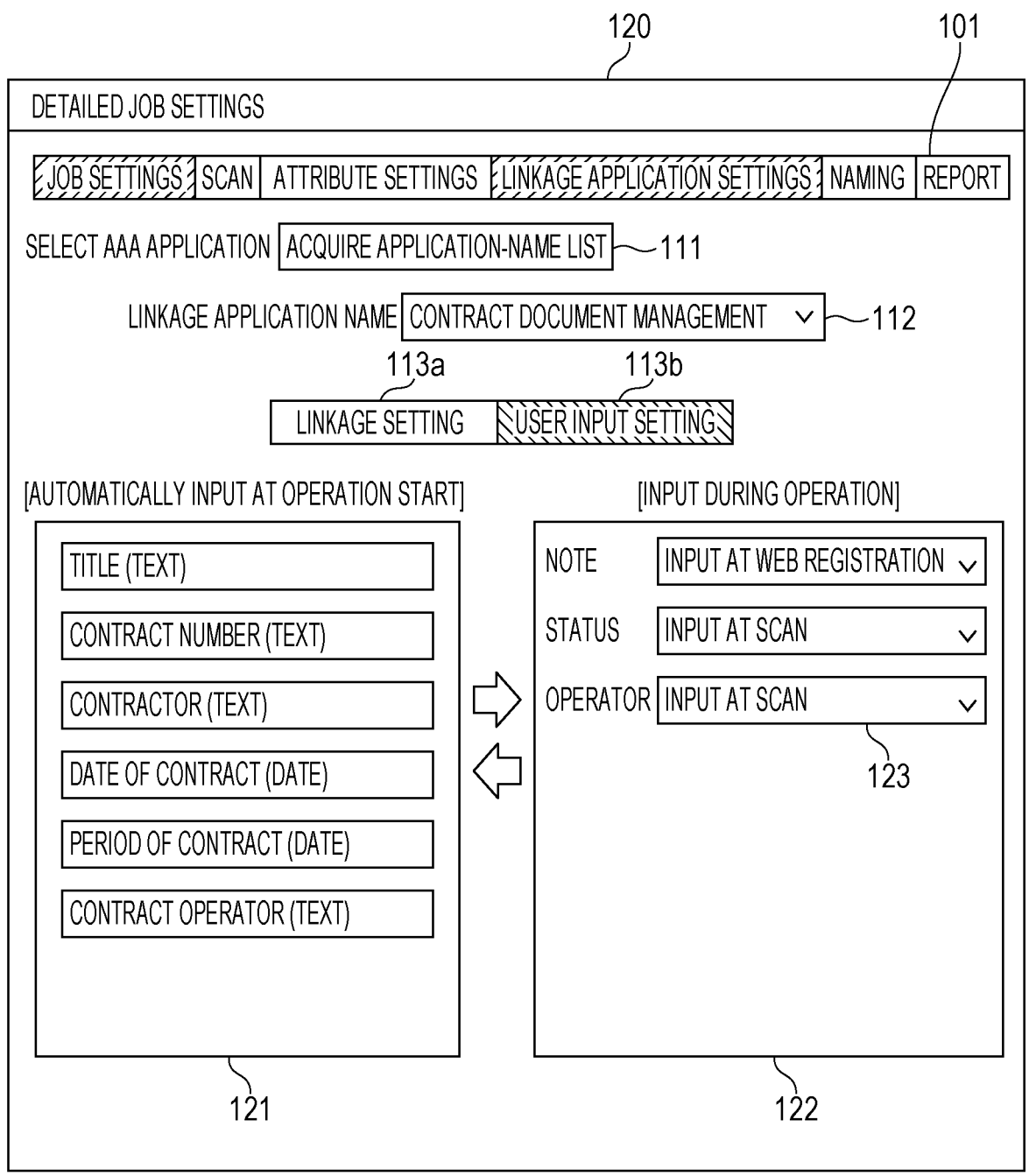
FIG. 10 is an illustration depicting an example of a screen for user input setting.

FIG. 10 is an illustration depicting an example of the screen for user input setting. Similarly to the screen for attribute linkage settings 110 depicted in FIG. 9, a screen for user input setting 120 presents the tabs 101 named "job settings", "scan", "attribute settings", "linkage application settings", "naming", and "report" and presents the button 111 named "acquire application-name list", the input box for an application name 112, the button 113*a* named "linkage setting", and the button 113*b* named "user input setting". The input box for an application name 112 is used to select the name of an application to be linked. FIG. 10 depicts a situation in which the tab named "linkage application settings" of the tabs 101 and the button 113*b* named "user input setting" are selected.

The screen for user input setting 120 has the display region for automatic-input attributes 121 and the display region for in-process-input attributes 122. The display region for automatic-input attributes 121 presents attributes whose attribute values of the link target are automatically input at the start of an operation, and the display region for in-process-input attributes 122 presents attributes whose attribute values of the link target are entered during the operation. The display region for automatic-input attributes 121 presents target attributes that have linkage to source attributes for which automatic extraction or automatic setting is selected when attributes are set. The display region for in-process-input attributes 122 has input boxes for input timing 123. The input boxes for input timing 123 each have a pull-down menu from which the input timing for an attribute value can be selected.

For an attribute for which "input at scan" is entered into one of the input boxes for input timing 123, an input screen is displayed by the operation/display unit 62 of the image forming apparatus 6 when a document is scanned. For an attribute for which "input at web registration" is selected in one of the input boxes for input timing 123, an input screen is displayed on the display 73 of the terminal apparatus 7 when a web page is registered. Target attributes presented in the display region for automatic-input attributes 121 and target attributes presented in the display region for inprocess-input attributes 122 are configured to move between the display region for automatic-input attributes 121 and the display region for in-process-input attributes 122 through a drag-and-drop operation on the screen for user input setting 120.

If an attribute is moved from the display region for automatic-input attributes 121, which has a message "automatically input at operation start", to the display region for in-process-input attributes 122, which has a message "input during operation", the input timing can be selected from a pull-down menu on the screen for user input setting 120. If an attribute is moved from the display region for in-process-input attributes 122, which has the message "input during operation", to the display region for automatic-input attributes 121, which has the message "automatically input at operation start", the screen for setting source attributes 100 is displayed, and the user is requested to select an attribute extraction method. The movement may be canceled if no selection is made for a certain amount of time.

Using the screen for user input setting 120 depicted in FIG. 10, the user operates the input unit 72 of the terminal apparatus 7 to configure the user input setting (S4).

As depicted in FIG. 7C, in accordance with the setting information in which the user input setting is configured in step S4, the recording unit 501 of the internal server 5 records the input timings in the column named "user input setting" of the database 512. In addition, in accordance with the setting information, the recording unit 501 of the internal server 5 creates the second history information 513*b* depicted in FIG. 6B. At this time, the second history information 513*b* is created regarding three items, the link target: status, the link target: operator, and the link target: note. In this stage, no value is recorded in these items.

(4) Workflow Registration

In response to instructions for registration from the terminal apparatus 7, the workflow creating unit 502 creates the workflow 514 in accordance with the database 512, attaches a workflow identification (ID), stores, and registers the workflow 514 in the repository 51. In this example, the source application 511 is assumed to perform, for example, such processes as a reading process, a character recognition process, an extraction process, and a sorting process. In the reading process, the image forming apparatus 6 reads image data in a paper document. In the character recognition process, characters in the read image data are recognized. In the extraction process, attributes of the document (for example, the contract number, the date of contract) are extracted from the character recognition result. In the sorting process, documents are sorted into repositories (for example, the repository 61 of the image forming apparatus 6 or folders in the repository 51 of the internal server 5) in accordance with the types of documents (for example, a contract and an invoice). The target application 30 is assumed to perform, for example, contract document management and progress management by using process results and attribute information obtained by the source application 511.

(5) Workflow Execution

Upon receiving instructions for workflow execution together with the workflow ID from the terminal apparatus 7 or the image forming apparatus 6, the workflow managing unit 503 of the internal server 5 activates the workflow 514 corresponding to the workflow ID stored in the repository 51 and executes the workflow 514 (S5).

In accordance with the database 512, the workflow managing unit 503 of the internal server 5 determines whether an input time point set in the user input setting is reached (S6). If the input time point (for example, "input at scan") set in the user input setting is reached (Yes in step S6), the web page transmitting unit 500 is caused to transmit information regarding an input screen containing a web page to the image forming apparatus 6. The controller 60 of the image forming apparatus 6 causes the operation/display unit 62 to present the input screen.

(6) Input Corresponding to User Input Setting

Figure 11:
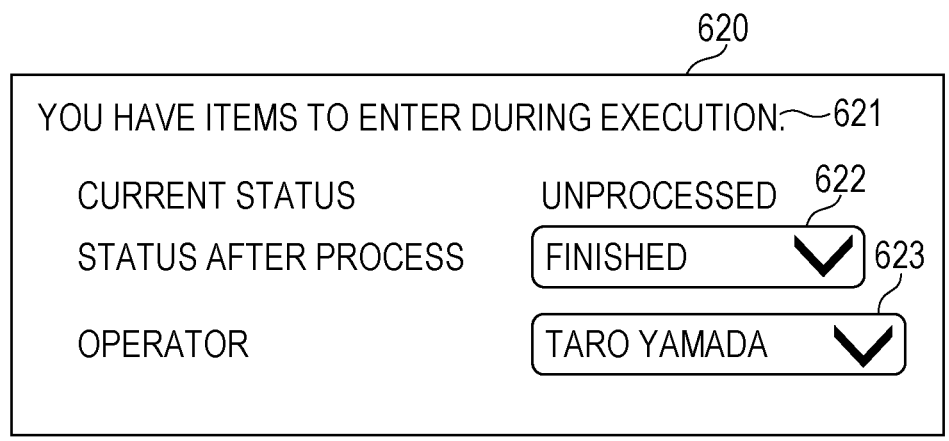
FIG. 11 is an illustration depicting an example of an input screen.

FIG. 11 is an illustration depicting an example of the input screen. An input screen 620 has a message 621 "You have items to enter during execution.", an input box for status 622, and an input box for operator name 623. The status after the process is entered into the input box for status 622, and an operator name is entered into the input box for operator name 623.

The user changes a name "Ryohei Yamada", which has been entered into the input box for operator name 623, to a name "Taro Yamada" (S7). The recording unit 501 of the internal server 5 updates the second history information 513*b* in accordance with attribute values entered at the time points that have been set. When an operator name is entered into the input box for operator name 623 on the input screen 620, a name list of users authorized to perform the process may be superimposed on the input screen 620, and an operator name may be selected from the name list.

The workflow managing unit 503 further performs the workflow 514 (S5). The workflow managing unit 503 determines whether an input time point set in the user input setting is reached (S6). If the input time point (for example, "input at web registration") set in the user input setting is reached (Yes in step S6), the web page transmitting unit 500 transmits information regarding a web page screen to the terminal apparatus 7. The display controller 701 of the terminal apparatus 7 causes the display 73 to present a screen for web registration.

FIG. 12 is an illustration depicting an example of the screen for web registration. A screen for web registration 200 has warning information 201 (for example, "*required" is presented in red) and input boxes 202. The warning information 201 requests an input for a specific attribute whose attribute value has not been entered.

Once the user enters one or more necessary attribute values into the corresponding input boxes 202 and enters one or more attribute values into the corresponding input boxes 202 to which the warning information 201 is attached (S7), the recording unit 501 of the internal server 5 updates the first history information 513*a* and the second history information 513*b* in accordance with the information that is entered. The workflow managing unit 503 further performs the workflow 514 (S5). If no input time point set in the user input setting is reached (No in step S6), the workflow managing unit 503 associates the attribute information of the link target with the target application 30 and the workflow ID in accordance with the first history information 513*a* and the second history information 513*b* and registers the attribute information of the link target in the external server 3 (S8).

Subsequently, in response to a request from the terminal apparatus 7 for presentation of a screen for history information as a result of the workflow 514 execution, the web page transmitting unit 500 creates information regarding the screen for history information in accordance with the first history information 513a and the second history information 513b and transmits the information regarding the screen for history information to the terminal apparatus 7. The display controller 701 of the terminal apparatus 7 causes the display 73 to present the screen for history information. If a request for presentation of the screen for history information is received from the image forming apparatus 6, the web page transmitting unit 500 may transmit the information regarding the screen for history information to the image forming apparatus 6 and causes the operation/display unit 62 to present the screen for history information.

Figure 13:
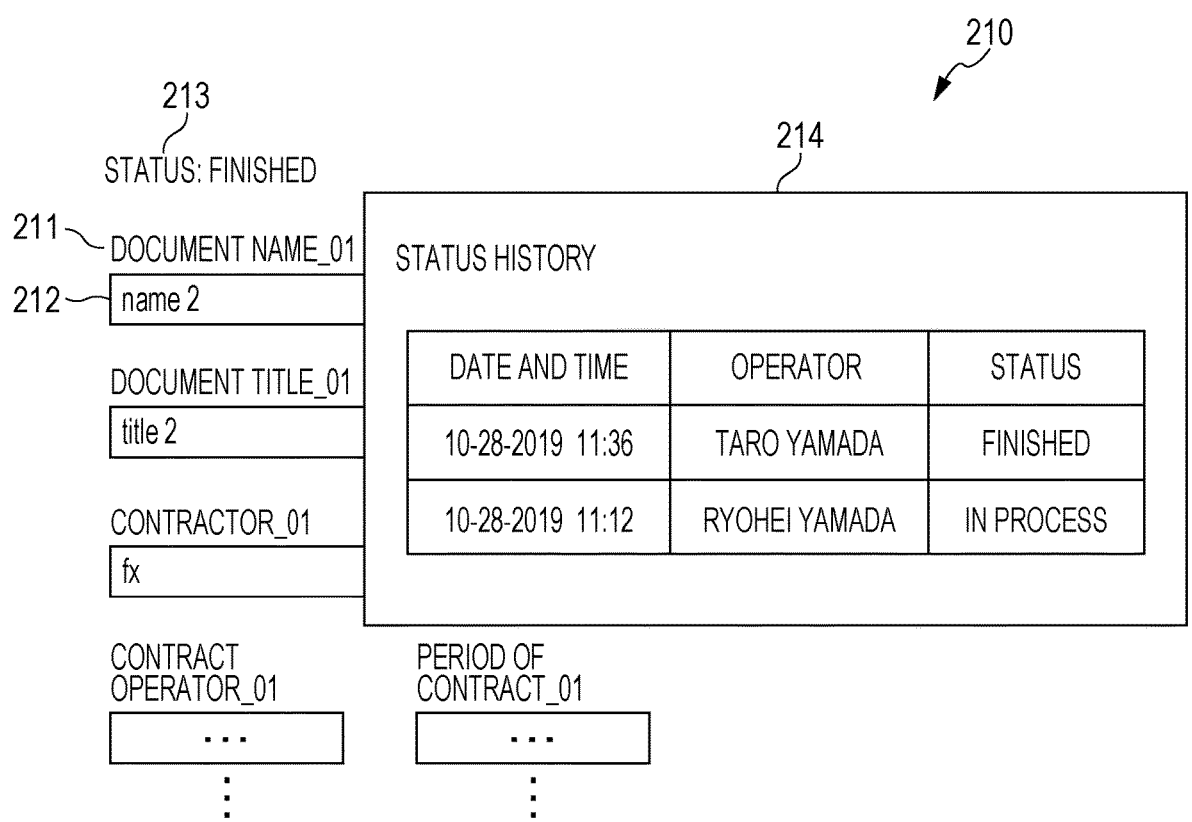
FIG. 13 is an illustration depicting an example of a screen for history information.
Figure 14:
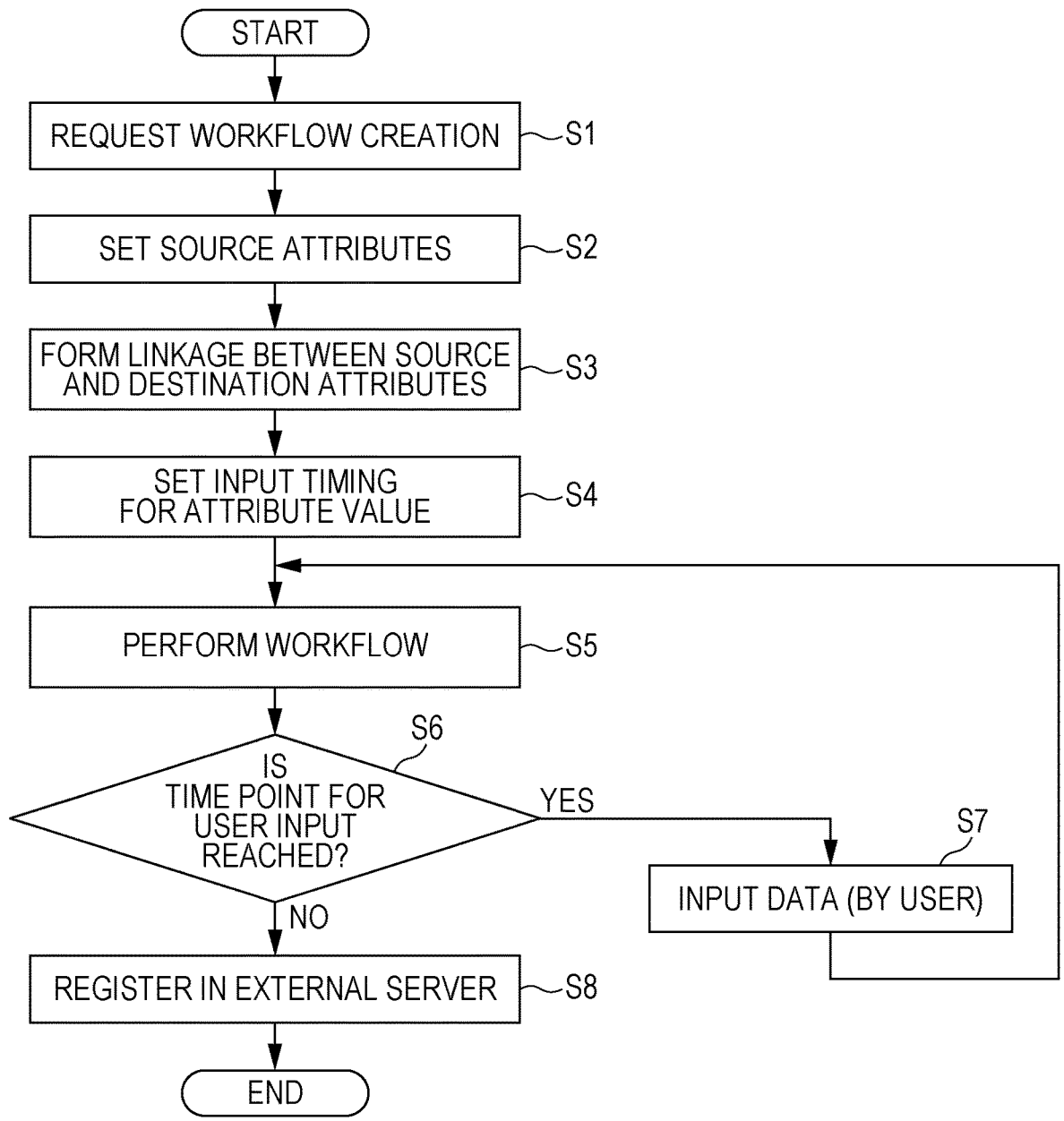
FIG. 14 is a flowchart depicting an example operation of the information processing system.

FIG. 13 is an illustration depicting an example presentation of a portion of the screen for history information. A screen for history information 210 has attributes 211 of the link target and the link source, attribute values 212, an attribute 213 for which the user input setting is configured, such as status, and history 214 of the attribute 213. Examples of the attributes 211 include a document name, a document title, a contractor, a contract operator, and a period of contract. Each of the attribute values 212 has been entered for the corresponding one of the attributes 211, and examples of the attribute values 212 include "name2", "title2", and "fx". The history 214 has items "date and time", "operator", and "status". The example depicted in FIG. 13 indicates that Ryohei Yamada performed a task at the start of a process at 11:12 on Oct. 28, 2019 and Taro Yamada performed a task to complete the process at 11:36 on Oct. 28, 2019.

First Modification

In the exemplary embodiment above, the case where the external server 3 retains the target application 30 and the internal server 5 retains the source application 511 has been described, but one of the external server 3 and the internal server 5 may retain both the target application and the source application. Alternatively, the image forming apparatus 6 may retain the source application.

Second Modification

In the exemplary embodiment above, the specific attributes and the other attributes each are presented in a separate display region on the screen for user input setting 120 but may be presented in a single display region. In such a case, the specific attributes may be presented more conspicuously than the other attributes. Color, a character size, or a typeface may be changed to emphasize the specific attributes.

Third Modification

In the exemplary embodiment above, the internal server 5 has been described as an example of an information processing apparatus, but the image forming apparatus 6 or the external server 3 may function as the information processing apparatus. Further, a plurality of image forming apparatuses 6 may be connected to the internal network 4, and one of the plurality of image forming apparatuses 6 may have a function equivalent to the function of the internal server 5 as the information processing apparatus.

Fourth Modification

In the exemplary embodiment above, the case where a target application and a source application are linked with each other has been described, but the number of target applications and the number of source applications may be more than one.

Fifth Modification

In the exemplary embodiment above, the specific attributes are included in the target attributes but may be included in the source attributes or in both the target attributes and the source attributes.

The exemplary embodiment according to the present disclosure has been described as above, but the exemplary embodiment according to the present disclosure is not limited to the exemplary embodiment described above. Various modifications and practices are possible.

A portion or all of each unit of the processors may be constituted by a hardware circuit, such as a field programmable gate array (FPGA) or an application specific integrated circuit (ASIC).

In the embodiment above, the term "processor" refers to hardware in a broad sense. Examples of the processor include general processors (e.g., CPU: Central Processing Unit), and dedicated processors (e.g., GPU: Graphics Processing Unit, ASIC: Application Specific Integrated Circuit, FPGA: Field Programmable Gate Array, and programmable logic device).

In the embodiment above, the term "processor" is broad enough to encompass one processor or plural processors in collaboration which are located physically apart from each other but may work cooperatively. The order of operations of the processor is not limited to one described in the embodiment above, and may be changed.

Further, some of the elements of the exemplary embodiment described above may be removed or modified. Further, addition, removal, modification, exchange, and the like of the steps in the flow in the exemplary embodiment described above are possible. The programs used in the exemplary embodiment described above may be recorded in a computer-readable recording medium, such as a compact-disc ROM (CD-ROM), and provided or may be stored in an external server such as a cloud server and used via a network.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a processor configured to
cause a user interface to be displayed that accepts an input that determines a timing that a user inputs an attribute value of a specific attribute when creating a program that runs by linking a first application of a link source and a second application of a link target, the specific attribute being one of attributes handled by the first application or the second application,
cause the user interface to present, in separate display regions, the specific attribute and one or more other attributes handled by the first application or the second application, the one or more other attributes having attribute values to be input before execution of the program starts, and acquire the specific attribute from the user at the timing, wherein the timing that the user inputs the attribute value is selectable from a plurality of predefined timings.

2. The information processing apparatus according to claim 1, wherein the processor accepts an order to move the specific attribute or one of the one or more other attributes from one of the separate display regions to the other of the separate display regions.

3. The information processing apparatus according to claim 1, wherein the processor causes the user interface to present a screen to accept an entry of a corresponding attribute value at a time point specified by the input for the timing of the attribute value.

4. The information processing apparatus according to claim 3, wherein the screen accepts data in a selectable manner from a user authorized to access a process of the program if the attribute value that is not entered or is to be changed is related to the user.

5. The information processing apparatus according to claim 1, wherein the plurality of predefined timings correspond to events that occur during execution of the first application or the second application.

6. A non-transitory computer readable medium storing a program causing a computer to execute a process for information processing, the process comprising:

causing a user interface to be displayed that accepts an input that determines a timing that a user inputs an attribute value of a specific attribute when creating a program that runs by linking a first application of a link source and a second application of a link target, the specific attribute being one of attributes handled by the first application or the second application, causing the user interface to present, in separate display regions, the specific attribute and one or more other attributes handled by the first application or the second application, the one or more other attributes having attribute values to be input before execution of the program starts, and acquiring the specific attribute from the user at the timing wherein the timing that the user inputs the attribute value is selectable from a plurality of predefined timing.

7. The non-transitory computer readable medium according to claim 6, wherein the plurality of predefined timings correspond to events that occur during execution of the first application or the second application.

8. An information processing apparatus comprising:

a processor configured to receive a request to create a program that runs by linking a first application of a link source and a second application of a link target, cause a user interface to be displayed that accepts an input that determines a timing that a user inputs an attribute value of a specific attribute when creating the program that runs by linking the first application of the link source and the second application of the link target, the specific attribute being one of attributes handled by the first application or the second application, cause the user interface to present, in separate display regions, the specific attribute and one or more other attributes handled by the first application or the second application, the one or more other attributes having attribute values to be input before execution of the program starts, acquire the specific attribute from the user at the timing, and run the program, wherein the timing that the user inputs the attribute value is selectable from a plurality of predefined timings.

* * * * *